(12) United States Patent
Meyerson et al.

(10) Patent No.: US 6,215,475 B1
(45) Date of Patent: Apr. 10, 2001

(54) HIGHLY INTEGRATED PORTABLE ELECTRONIC WORK SLATE UNIT

(75) Inventors: Robert F. Meyerson, Captiva Island, FL (US); Yung-Fu Chang, Medina, OH (US)

(73) Assignee: Telxon Corporation, Akron, OH (US)

( * ) Notice: Subject to any disclaimer, the term of this patent is extended or adjusted under 35 U.S.C. 154(b) by 0 days.

(21) Appl. No.: 08/486,830

(22) Filed: Jun. 7, 1995

Related U.S. Application Data

(63) Continuation of application No. 08/268,806, filed on Jun. 30, 1994, now Pat. No. 5,594,470, which is a continuation of application No. 07/956,112, filed on Oct. 2, 1992, now abandoned.

(51) Int. Cl.[7] .................................................. G09G 5/00
(52) U.S. Cl. ............................................. 345/173; 345/169
(58) Field of Search .............................. 235/472; 382/59; 340/825.26, 825.27–825.29; 248/917, 918, 919; 341/22, 27, 32, 33; 455/347–351; D14/100, 106, 113, 115; 367/708, 709.1; 379/440, 428; 368/10, 13, 203, 204; 345/173–183; 178/18–20; 364/900

(56) References Cited

U.S. PATENT DOCUMENTS

| D. 270,061 | 8/1983 | Ackeret . | |
|---|---|---|---|
| D. 270,062 | 8/1983 | Ackeret . | |
| D. 270,063 | 8/1983 | Ackeret . | |
| D. 297,939 | * 10/1988 | Bradbury et al. | D14/100 X |
| D. 309,295 | * 7/1990 | de la Huerga et al. | D14/100 |
| D. 314,372 | 2/1991 | Morris . | |
| D. 315,549 | 3/1991 | Clough et al. . | |
| D. 319,433 | 8/1991 | Pearce . | |
| D. 338,656 | 8/1993 | Spaude . | |
| D. 345,147 | 3/1994 | Fukutake et al. . | |
| D. 346,999 | 5/1994 | Meyerson et al. . | |
| D. 348,654 | 7/1994 | Branck et al. . | |
| D. 356,299 | 3/1995 | Hamilton et al. . | |
| 3,356,836 | 12/1967 | Stenby . | |
| 3,876,863 | 4/1975 | Boone . | |
| 4,279,021 | 7/1981 | See et al. . | |
| 4,336,530 | 6/1982 | Koike et al. . | |
| 4,387,297 | 6/1983 | Swartz et al. . | |
| 4,412,751 | 11/1983 | Jeannet et al. . | |
| 4,458,238 | * 7/1984 | Learn | 345/169 X |
| 4,460,120 | 7/1984 | Shepard et al. . | |
| 4,523,297 | 6/1985 | Ugon et al. . | |
| 4,587,630 | 5/1986 | Straton et al. . | |
| 4,593,186 | 6/1986 | Swartz et al. . | |

(List continued on next page.)

FOREIGN PATENT DOCUMENTS

| 803268 | 12/1990 | (JP) . |
|---|---|---|
| 9104461 | 4/1991 | (WO) . |

OTHER PUBLICATIONS

Telxon Corporation Brochure Entitled "PTC–1180 Wireless Pen–Based Computer Tablet", Dated Jan. 1994.

(List continued on next page.)

Primary Examiner—Xiao Wu
(74) Attorney, Agent, or Firm—Watts, Hoffmann, Fisher & Heinke, Co., L.P.A.

(57) ABSTRACT

A portable electronic work slate unit includes a customizable array of data devices and input/output devices which are selectively integrated in a compact and highly ergonomic structure. Increased operator productivity is accomplished by use of several possible user interface media including a multi-function display and input/output unit including a digitizer, position sensitive screen, and video display panel. Selectively integratable user interface components include a bar code scanner, RF modulator for radio frequency communication, modem, audio input/output, as well as the multi-purpose display. All components are integrated by use of a handle unit which can house a battery as well as removable modules in a manner so as to minimize operator fatigue and discomfort, as well as enhance productivity.

9 Claims, 6 Drawing Sheets

U.S. PATENT DOCUMENTS

| | | | |
|---|---|---|---|
| 4,660,221 | | 4/1987 | Diugos . |
| 4,664,101 | | 5/1987 | Granberg . |
| 4,686,332 | | 8/1987 | Greanias et al. . |
| 4,725,694 | | 2/1988 | Auer et al. . |
| 4,758,717 | | 7/1988 | Shepard et al. . |
| 4,794,239 | | 12/1988 | Allais . |
| 4,835,713 | | 5/1989 | Pastor . |
| 4,847,818 | | 7/1989 | Olsen . |
| 4,866,642 | | 9/1989 | Obrig et al. . |
| 4,866,646 | | 9/1989 | Nakamura et al. . |
| 4,885,580 | | 12/1989 | Noto et al. . |
| 4,889,982 | | 12/1989 | Young et al. . |
| 4,916,441 | | 4/1990 | Gombrich . |
| 4,954,967 | | 9/1990 | Takahashi . |
| 4,969,206 | | 11/1990 | Desrochers . |
| 5,007,085 | | 4/1991 | Grenias et al. . |
| 5,015,831 | | 5/1991 | Eastman et al. . |
| 5,031,119 | | 7/1991 | Dulaney et al. . |
| 5,059,778 | * | 10/1991 | Zouzoulas et al. ............. 382/313 X |
| 5,107,253 | | 4/1992 | Meadows . |
| 5,110,226 | | 5/1992 | Sherman et al. . |
| 5,113,445 | | 5/1992 | Wang . |
| 5,123,064 | * | 6/1992 | Hacker et al. ..................... 178/18 X |
| 5,130,520 | | 7/1992 | Shepard et al. . |
| 5,144,120 | | 9/1992 | Krichever et al. . |
| 5,202,817 | | 4/1993 | Koenck et al. . |
| 5,216,233 | | 6/1993 | Main . |
| 5,227,614 | | 7/1993 | Danielson et al. . |
| 5,227,617 | | 7/1993 | Christopher et al. . |
| 5,235,495 | | 8/1993 | Blair et al. . |
| 5,237,161 | | 8/1993 | Grodevant . |
| 5,243,655 | | 9/1993 | Wang . |
| 5,264,992 | | 11/1993 | Hogdahl et al. . |
| 5,304,786 | | 4/1994 | Pavlidis et al. . |
| 5,324,925 | | 6/1994 | Koenck et al. . |
| 5,331,136 | | 7/1994 | Koenck et al. . |
| 5,334,821 | | 8/1994 | Campo et al. . |
| 5,337,361 | | 8/1994 | Wang et al. . |
| 5,347,115 | * | 9/1994 | Sherman et al. ..................... 235/472 |
| 5,350,909 | * | 9/1994 | Powell et al. ........................ 235/472 |
| 5,367,152 | | 11/1994 | Krichever et al. . |
| 5,373,148 | * | 12/1994 | Dvorkis et al. ...................... 235/472 |
| 5,375,076 | | 12/1994 | Goodrich et al. . |
| 5,378,883 | * | 1/1995 | Batterman et al. .................. 235/472 |
| 5,386,107 | * | 1/1995 | Dvorkis et al. ...................... 235/472 |
| 5,408,077 | | 4/1995 | Campo et al. . |
| 5,408,078 | | 4/1995 | Campo et al. . |
| 5,410,141 | * | 4/1995 | Koenck et al. ...................... 235/472 |

OTHER PUBLICATIONS

Telxon Corporation Brochure Entitled "The Wireless Hospital—Time and Cost Saving Solutions for Healthcare Information Networks", Copyright 1994.

Advertisement in *Automatic I.D. News* for Monarch Marking Systems, Thermal Transfer Renegade Printer, p. 22, Dated Apr. 1994.

Magazine Article From *Automatic I.D. News* Entitled "Pen--Based System to the Rescue: Speed Fire Inspections and More", p. 21, Dated Apr. 1994.

Article Published by Symbol Technologies, Inc.—"A Primer for Two Dimensional Bar Codes, Portable Data Files, and PDF 417," Dated Oct. 1990 by Stuart Itkin.

Telxon Corporation Brochure Entitled "PTC–1140 Wireless Pen–Based Computer", Dated Jan. 1994.

* cited by examiner

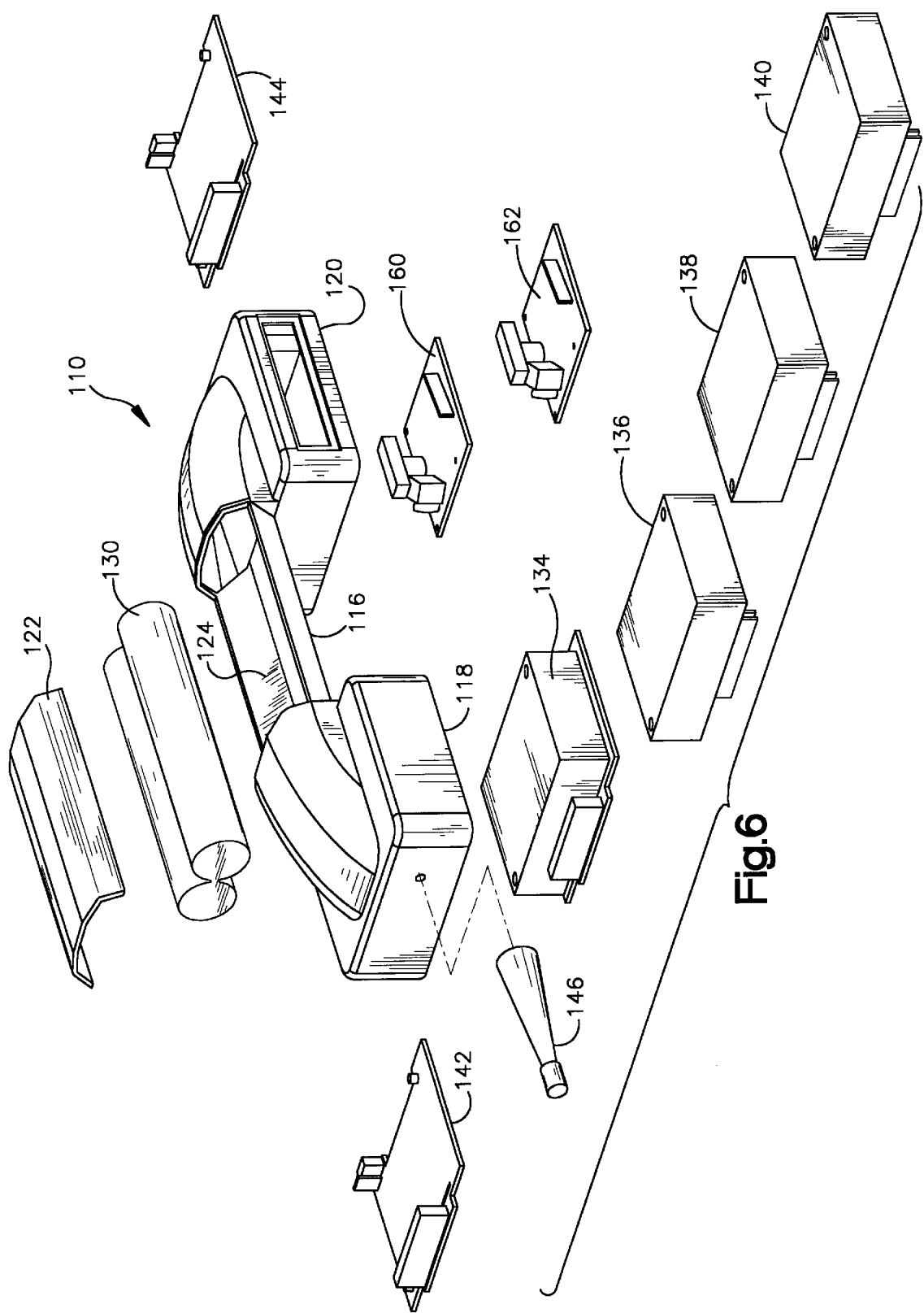

HIGHLY INTEGRATED PORTABLE ELECTRONIC WORK SLATE UNIT

This is a continuation of application Ser. No. 08/268,806, filed Jun. 30, 1994, now U.S. Pat. No. 5,594,470, which is a continuation of application Ser. No. 07/956,112, filed Oct. 2, 1992, now abandoned.

BACKGROUND OF THE INVENTION

This application pertains to the art of portable electronic work slate units and more particularyly to such electronic work slate units which are employed in full-time day-to-day operation in field uses such as inventory control and delivery tracking, and will be described with particular reference thereto. However, it will be appreciated that the invention has broader application, such as in any data processor in which a high degree of integration, portability and customization is advantageous.

Present day on-site services and delivery services increasingly rely on automated inventory control, remote data acquisition, and on-going data communication with their base of operations. Many technologies have evolved which allow for use of automation in these areas. These technologies include widespread use of inventory indicia readily susceptible to automated inventory control. These include package coding such as bar coding, RF coding, and the like. Further, advances in remote communications such as is provided with present-day cellular communication, as well as remote point-to-point data communications such as via modem/telephone interconnect, enable virtually constant data interchange between a home unit and a remote site.

Such remote data collection has spawned a first generation of portable data devices, such as that provided by U.S. Pat. No. 4,279,021 entitled Portable Data Entry Apparatus Including Plural Selectable Functional Configurations, assigned to Telxon Corporation. While such first generation units served well, a greater portion of the work force is entering, or posed to enter use of such remote data units. The increase in usage will require greater adaptability and features available to the portable unit to accomplish disparate uses with minimized costs associated with such application-specific areas. Further, greater utilization requires greater resources to be expended educating a user base. Accordingly, a more user-friendly interface would also be advantageous. Finally, increased reliance on data devices means that operators will be using them over extended periods of time throughout a work day. Accordingly, increased ergonomics to lessen user fatigue and increase productivity would also be advantageous.

The present invention contemplates a new and improved remote-data acquisition and processor unit which overcomes the above referred problems, and others, and provides a unit which may be comfortably utilized for extended periods with lessened fatigue, which provides an interface which requires minimized operator training, as well as a unit which integrates only those functions required to a specific application to minimize component costs, while simultaneously preserving expansion ability.

SUMMARY OF THE INVENTION

In accordance with the present invention, there is provided a highly integrated portable electronic work slate unit which includes a central processor. The central processor unit is supported by random access memory or RAM disposed in its address space for storage of programs and data. A user interface or input/output unit includes a relatively large multi-purpose display panel. The display panel is adapted for low power consuming visual display of graphics and character-based information. The display may also be touch-sensitive to facilitate receipt of user input by human touch. The display also includes an electromagnetic transducer to facilitate receipt of user input via a pen-based stylus.

In accordance with another aspect of the present invention, the multi-purpose display is adapted for receiving selected ones of a plurality of overlays on at least a portion thereof so as to allow for customization in accordance with specific user needs.

In accordance with another aspect of the present invention, selectively includable integratable input/output components include a radio frequency modulator for RF communication, a modulation device for infrared communication, a bar code reader, an audio input/output unit, bulk storage such as an integrated hard disk, and a modem.

In accordance with another aspect of the present invention, an ergonomic housing is provided for containing the various subassemblies of the invention.

An advantage of the present system is the provision of a highly-integrated data acquisition and processing unit which is component-customizable to particular user applications.

Another advantage of the present system is the provision of a unit which is adapted for providing an interface which requires minimal user training.

Yet another advantage of the present system is the provision of a unit with improved ergonomics to minimize operator fatigue through extended uses.

Further advantages will become apparent to one of ordinary skill in the art upon reading and understanding the subject specification.

BRIEF DESCRIPTION OF THE DRAWINGS

The invention may take physical form in certain parts and arrangements of parts, the preferred embodiment of which will be described in detail in this specification and illustrated in the accompanying drawings which form a part thereof, and wherein:

FIG. 6 illustrates an exploded view of the handle portion of the unit of FIG. 3.

DETAILED DESCRIPTION OF PREFERRED EMBODIMENT

Figure 1:
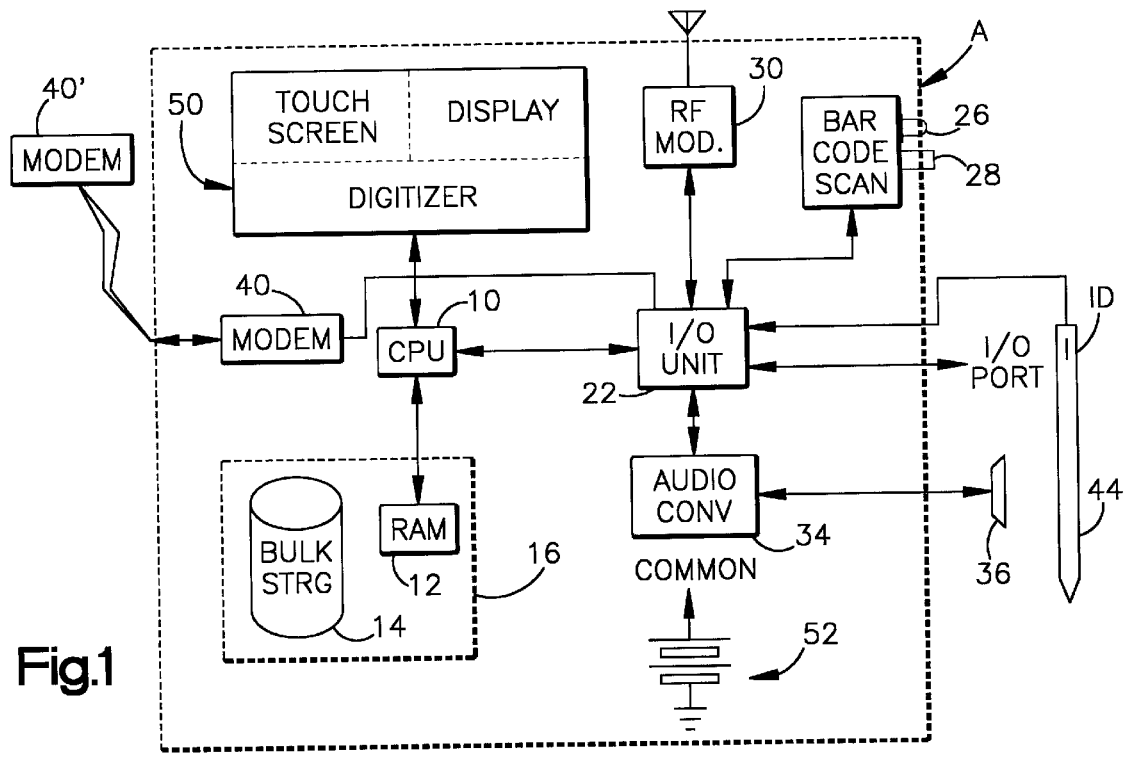
FIG. 1 illustrates, in block diagram form, the data processing and input/output component of an embodiment of the subject invention.

Referring now to the drawings, wherein the showings are for purposes of illustrating the preferred embodiment of the invention only, and not for the purposes of limiting same, FIG. 1 shows, in block diagram form, a highly integrated portable electronic work slate unit A. The unit A includes a central processor unit ("CPU") 10 advantageously formed of a microprocessor. Current microprocessor technology advantageously provides high data throughput capability and memory addressing. Further, the recent generation of microprocessor-based CPUs also incorporates power management capabilities which are particularly advantageous with battery-powered units. Finally, a maturation of software associated with microprocessor-based design has resulted in various operating system options, including DOS, UNIX, and the like. Further, the microprocessor-based operating system market has also matured from menuing interfaces to include graphical user interfaces ("GUIs"). Such GUIs have further progressed to the point where they can receive pen-based input on appropriate hardware, in addition to the more traditional keyboard or mouse inputs.

Several pen-based systems are currently available. These include PEN-WINDOWS of Microsoft Corporation, Redmond, Wash., as well as an analogous PENPOINT interface by GO Corporation. The microprocessor is suitably formed by an 80386SL processor of Intel Corporation of Santa Clara, Calif. or equivalent. The "386SL" chip or its counterparts advantageously provide a large address space, support for the above-noted GUI interfaces, as well as integrated advanced power management capabilities.

The processor of the preferred embodiment is an F 8680 of Chips & Technologies, Inc. While this processor is advantageously employed in the preferred embodiment, it will be appreciated that the rapidly evolving state of microprocessor design will provide a continuous stream of improved processors which provide these advantages, and more. It will be appreciated further that any such processor can advantageously be used in connection with the subject invention.

The CPU 10 is provided with random access memory ("RAM") 12 within its address space. Although RAM is commonly formed of dynamic random access memory ("DRAM"), certain other memory options provide advantages when use as a replacement for or substitute to DRAM.

DRAM is presently very compact, as well as inexpensive. However, it suffers from volatility. That is, memory contents are lost when electric power to the DRAM is interrupted. Permanent or non-volatile RAM is not presently as compact as DRAM, but is advantageously employed for at least a portion of the memory 12. Such non-volatile RAM may suitably include read-only memory ("ROM") or alterable semi-permanent memory such as currently available flash-EEPROM (electrically erasable programmable read-only memory). Such non-volatile memory is also available in card-based systems such as IC cards, flash EEPROM cards, PCMCIA expansion cards, and the like. Also, an intermediate fast or cache ram is also advantageously employed in RAM 12, especially when relatively slow memory is utilized as compared to CPU speed.

The subject system also employs a selectively-includable bulk storage medium 14 such as a hard disk. Current hard disk technology has reduced relatively high-capacity hard disks to a form factor less than 1.5 inches. The low mass associated with such compact hard drives facilitates quick response and low power consumption due to lessened inertia associated with low-mass media rotation. Together, the RAM unit 12 and bulk storage unit 14 form memory 16. With an appropriate operating system, a combination of bulk storage and RAM provided within memory 16 can form a virtual memory system to CPU 10 as will be appreciated.

The CPU 10 is also placed in data communication with an I/O unit 22. The I/O unit 22 is suited to facilitate use of selected one of a plurality of I/O devices. This advantageously provides modularity which allows for customization of the device to the requirements of particular and disparate user needs. As illustrated, such components include a bar code scanner 24, which is illustrated with a solid-state laser-diode illumination device 26 and a photo receptor 28. A multi-purpose I/O port is suitably formed of a RS-232 serial port or a parallel port and is advantageously provided to allow interconnection with a printer, network device or other external peripheral.

A second device is formed by an RF modulation unit 30. Such RF modulation facilitates various remote communication prospects, such as via cellular networks, spread spectrum radio, wide area radio networks and satellite communication. RF modules to accomplish these tasks are commercially available and well within the understanding of one of ordinary skill in the art.

Another component adapted for interface with I/O unit 22 is formed from an audio conversion unit 34. Current GUI interfaces have seamlessly integrated audio capabilities. Audio provides immediate and effective feedback from an application which augments human cognition. Further, conventional audio conversion technology has evolved to allow for limited application interface by human operator speech. Although present technology for such speech recognition is limited to discrete word annunciation, user specific voice or limited vocabulary, such schemes are extremely advantageous in a remote data acquisition environment.

Illustrated in electrical communication with audio conversion unit 34 is an audio transducer module 36 which is suitably formed of a speaker, microphone, or combination of the two.

An additional I/O component interface with I/O unit 22 is a modulation/demodulation unit ("modem") 40. Conventional modem technology facilitates generation of an audio signal representative of a digitized data stream which is easily propagated via conventional telephone lines. The modulated audio data is communicated to a secondary modem such as that illustrated by 40'. The I/O unit 22 is also adapted for interaction with a stylus or pen-based device such as pen or stylus 44. The connection between stylus 44 and the unit A is suitably physical, RF, or optical as is conventional within the art. The stylus 44 advantageously includes a unique identifier ID, to preclude communication with any unit other than a designated unit. This significantly improves data security, particularly when no physical connection between the stylus and base unit exists. The stylus 44 interacts with the pen-base operating system described above when coupled with an appropriate interface. Such an interface is provided by a multi-function display unit for user interface unit 50.

In the preferred embodiment, the multi-function display 50 includes a generally-planar video display panel. This system advantageously provides low-power generation of pixel-based data. Accordingly, both graphical displays, as well as characters, are generatable. Liquid crystal technology affords acceptable pixel resolution which is combined with low-power consumption, particularly in passive-matrix designs. The display advantageously provides user touch-sensitivity, as well as digitizer capabilities when utilized with an electromagnetic, electrostatic or optical stylus such as that provided by stylus 44. This layering as achieved by available technology will be illustrated further below.

As will be apparent from the foregoing, the entire data processing and acquisition unit A has been chosen such that the components are compact and consume minimal power. Accordingly, the entire unit is adapted for powering by a single battery unit 52 which is integrated therein. In the preferred embodiment, the battery unit 52 is formed of a rechargeable-battery such as nickel-cadmium, nickel-metal-hydride, or the like. With this arrangement, the handle unit typically comprises about 25 percent of a total weight of the entire unit.

Figure 2:
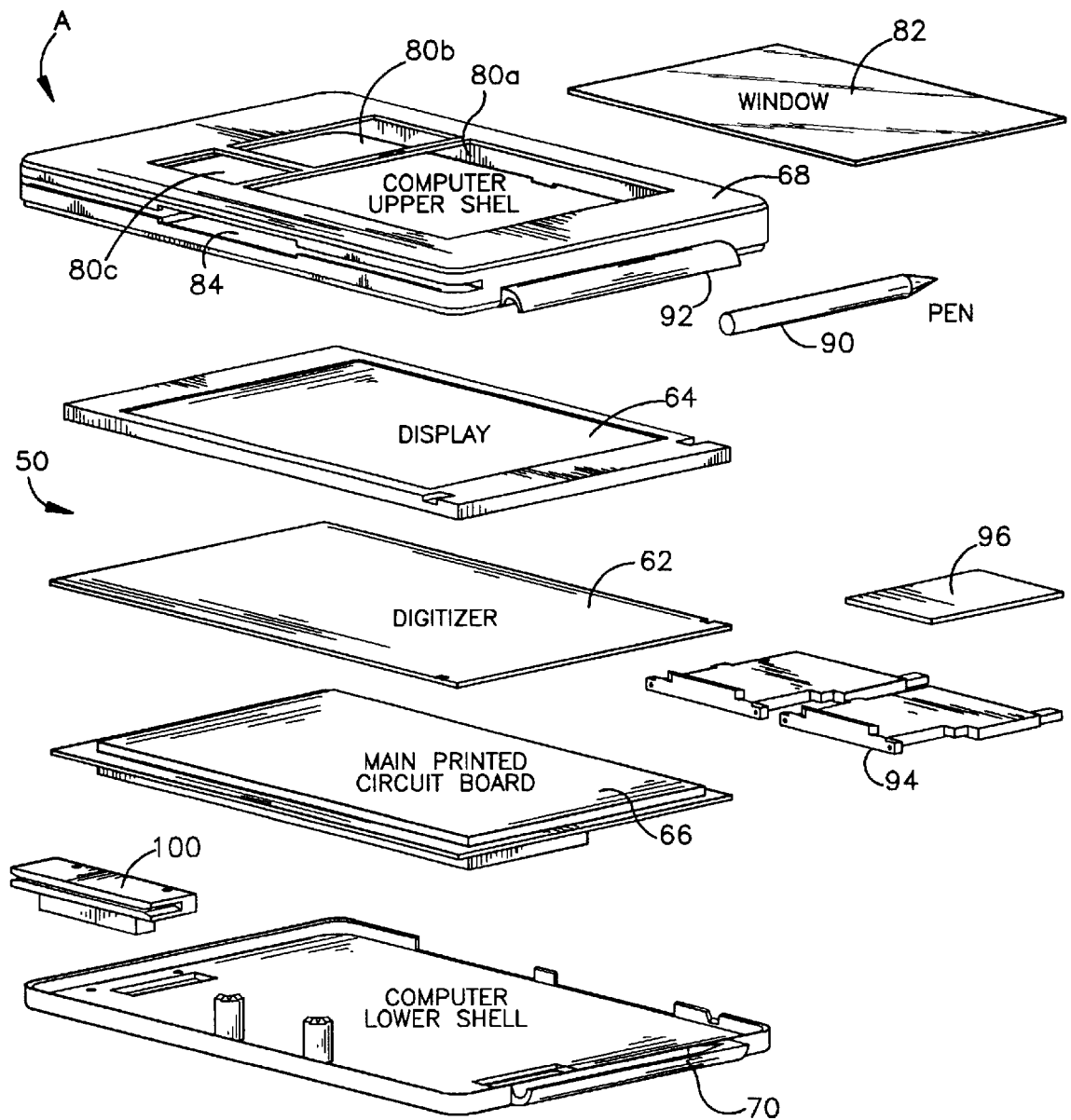
FIG. 2 illustrates, in an exploded view, the layering utilized by the multi-purpose display terminal portion in one form of the subject invention.

Turning now to FIG. 2, there is shown an exploded view of the unit A. Illustrated in this embodiment is a digitizer 62 and a display 64. The display 64 is comprised of a flat panel LCD display portion. Accordingly, characters or graphic information provided by the display portion 64 are viewable by a user. User input via touch or stylus is suitably integratable to the GUI display generated by the GUI interface and as illustrated on the display portion. A more detailed discussion on a suitably adapted multi-purpose display may be found in U.S. Pat. No. 4,686,332 entitled "Combined Finger Touch and Stylus Detection System for Use of the Viewing Surface of a Visual Display Device", the contents of which are incorporated herein by reference.

FIG. 2 also illustrates a main circuit board 66, on which the primary electronic constituent components are suitably positioned. The main circuit board 66 is advantageously disposed below the digitizer to allow for planar construction, thereby maintaining the system form and ergonomics. The digitizer 62, display 64, and the printed circuit board 66 are disposed between upper and lower shell portions 68 and 70, respectively. The shell portions are suitably formed from any polymer compound which is known to provide a lightweight, high-impact tolerant shell.

The upper shell 68 includes one or more aperture portions 80, illustrated as portions 80a, 80b and 80c. The aperture portions 80 alternatively allow a visual display and facilitate user input while allowing for electrostatic communication between window 82 and the unit A for the reasons noted below. It will be appreciated that the subject orientation of the digitizer 62 and the display 64 facilitates selected designation of the display area as user input, information display, or both. For example, the illustrated embodiment may simply provide primary information display in aperture portion 80a. Although aperture portions may thereby be primarily designated for data entry or output, the combination of display and digitizer provides for intra-aperture variation. For example, "buttons" or touch sensitive areas may have indicia thereon modified during operation to communicate modified input associated therewith.

The above-described configuration of the upper shell portion 68 is advantageously adapted with a window portion 82. The window 82 is slidably received in a slot portion 84, of the upper shell 80a sized to receive it matingly therein. The window 82 of the preferred embodiment provides position or touch sensitivity via implementation suitable electromagnetic, electrical, or optical transducers. The window 82 advantageously bears suitable indicia particular to a given operator task. Various windows 82 may be received into the slot portion 84 to provide a default user data entry/display template for a specified job.

Also illustrated in FIG. 2 is a stylus or pen unit 90 which is securable onto a mount 92. As noted above, the subject system is adapted for hand-writing recognition in concert with the digitizer 62, as well as touch-sensitive data entry. The pen 90 is selectively usable in connection with this interface as will be appreciated by one of ordinary skill in the art. When the pen 90 is utilized for writing input, a portion of the display is advantageously utilized to allow user specified numeric or alpha hand-writing. That is, hand written data entry, under today's technology, benefits from a prior knowledge as to whether alpha-based text or numeric data is to be expected. So designating a portion of the user interface as a indicator allows for increased data recognition, integrity, and reliability. When this is used, an operator would, for example, tap the area when numeric data is written and again tap the area when non-numeric or other character-based data is to be expected. Use of this system also allows for minimized processor power requirement, as well as a more responsive overall system due to lessened calculations.

FIG. 2 also illustrates a magnetic stripe reader 100 which is optionally fixedly secured into the system within the lower shell portion 70. Such magnetic stripe readers are advantageously used for data input as will be appreciated by one of ordinary skill in the art. Also illustrated is a series of PCMCIA peripherals, including a memory cartridge 94 and memory card 96. A growing number of PCMCIA components, such as flash EEPROM cards, modems, and the like are finding increased availability and usage in connection with compact computer designs.

Figure 3:
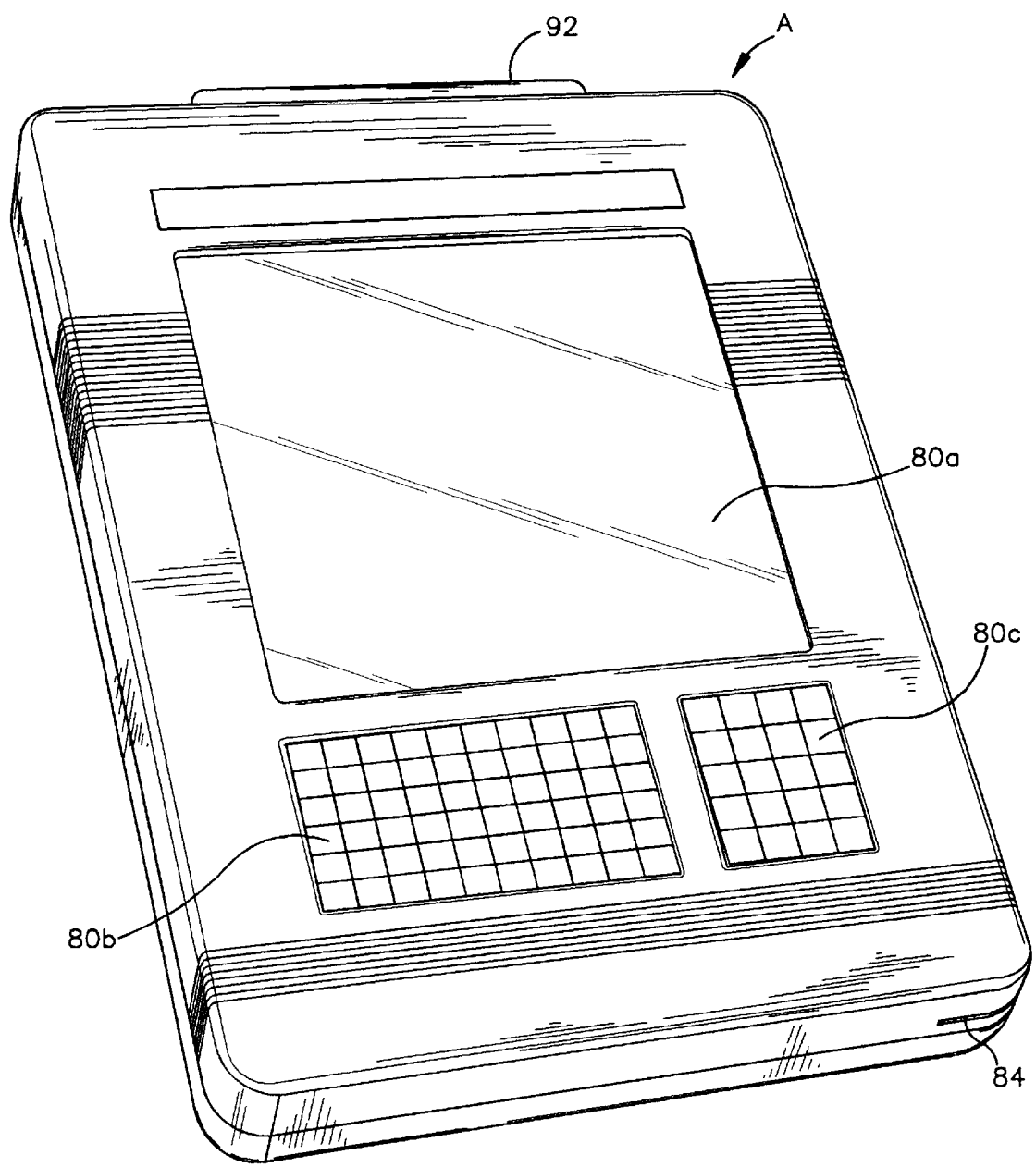
FIG. 3 illustrates a front view of one embodiment of a compact and ergonomic multi-function electronic work slate of the subject invention.

Turning now to FIG. 3, a front view of an assembled system of FIG. 2 is provided. This figure provides a better illustration of the input/display portion. It will be seen that in this embodiment the aperture portion 80a is earmarked for data viewing, while the portions 80b and 80c have been provided with touch sensitive "key" areas to facilitate data entry. Also evidenced is the slot portion 84 to receive the window 82 (FIG. 2) in the manner described above.

Figure 4:
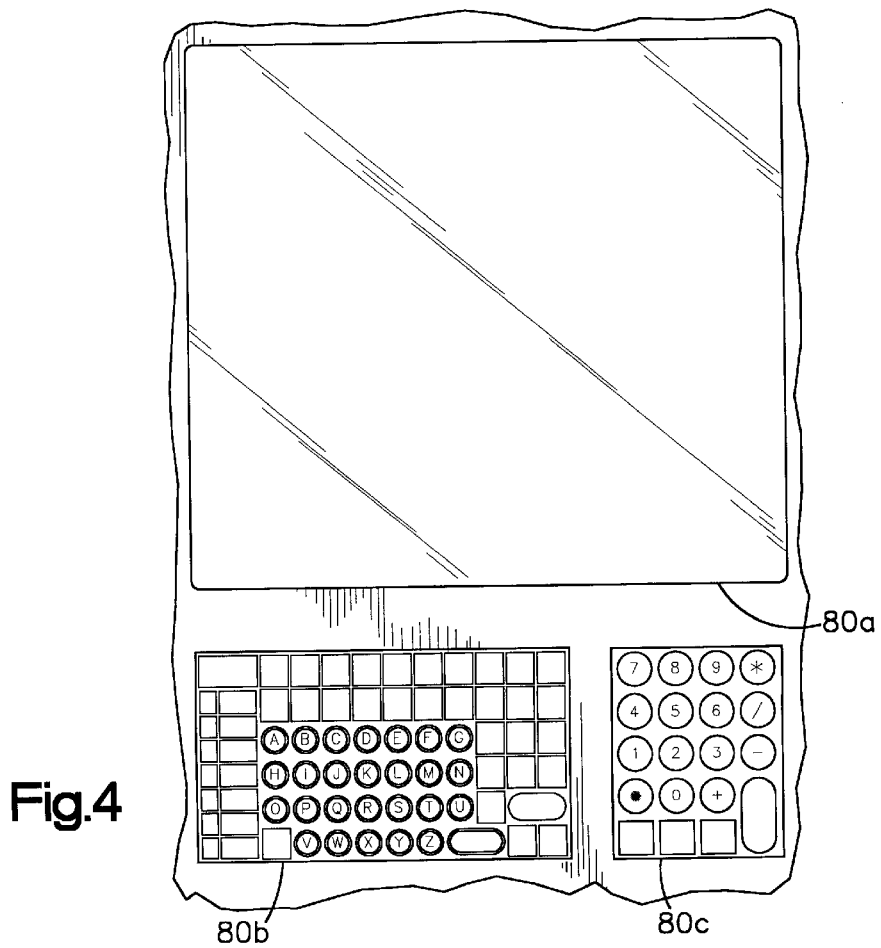
FIG. 4 illustrates an adaptation of the user interface of the display portion of FIG. 3.

Turning now to FIG. 4, suitable application specific indicia for the various aperture portions is evidenced. Therein, it will be seen that the aperture portion 80a remains primarily for visual display. The portion 80b has been provided with touch sensitive areas directed to alphabetic key entry, as well as specific jobs-related information. The portion 80b has been provided with a numeric keypad for number entry. The example format of FIG. 4 is suitably defined by a combination of a specific window 82, as well as software definition for the display.

Figure 5:
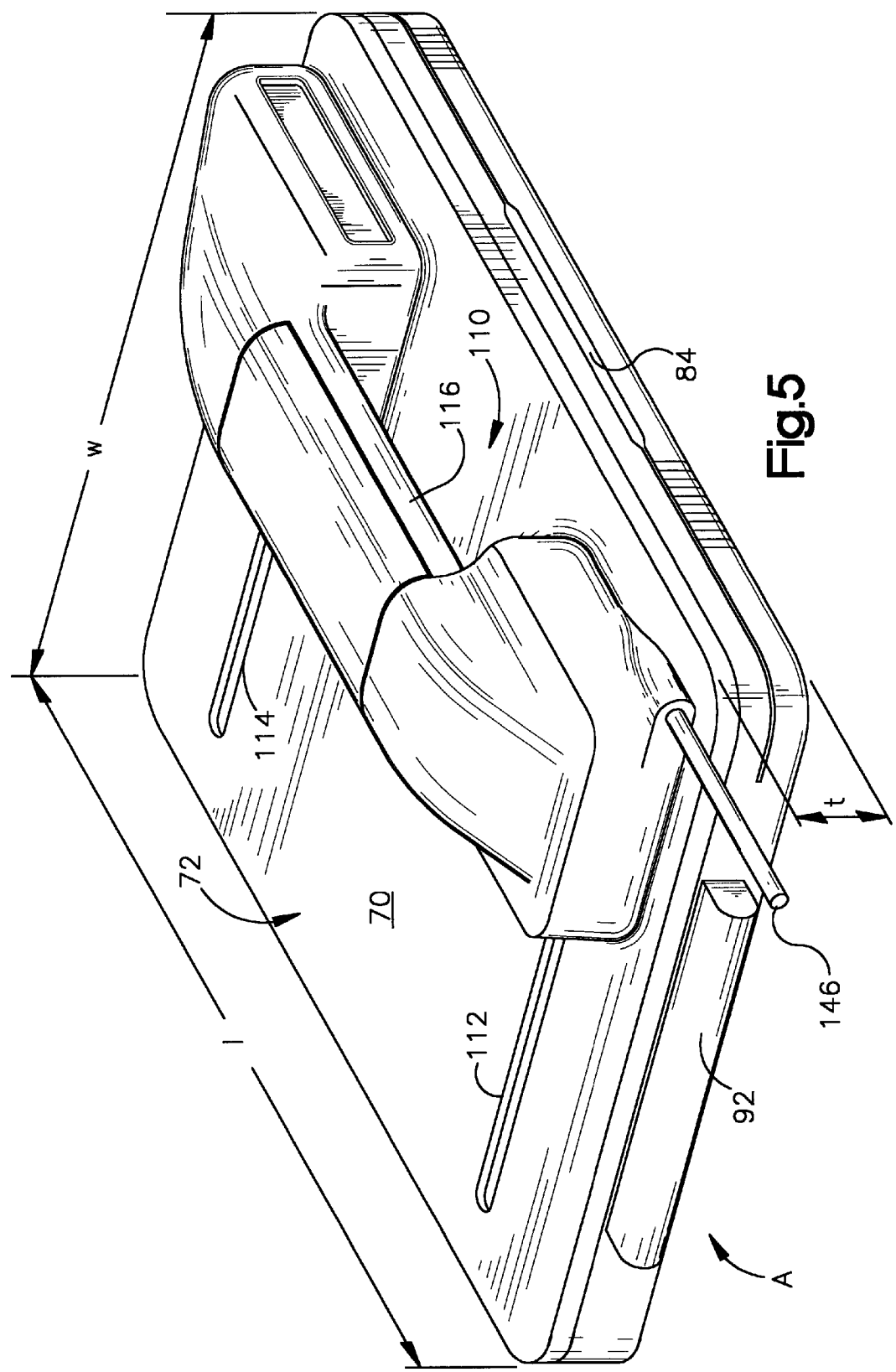
FIG. 5 illustrates a rear view of the unit of FIG. 3.
Figure 7B:
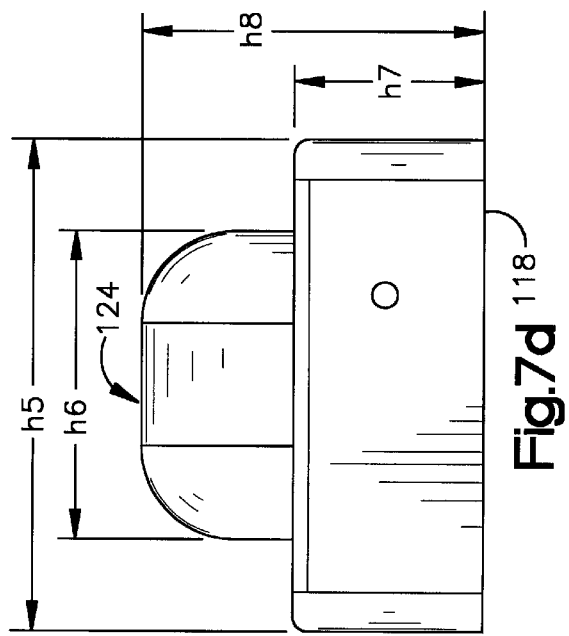
FIG. 7 illustrates several views of the ergonometric handle unit of the unit of FIG. 3.
Figure 7D:
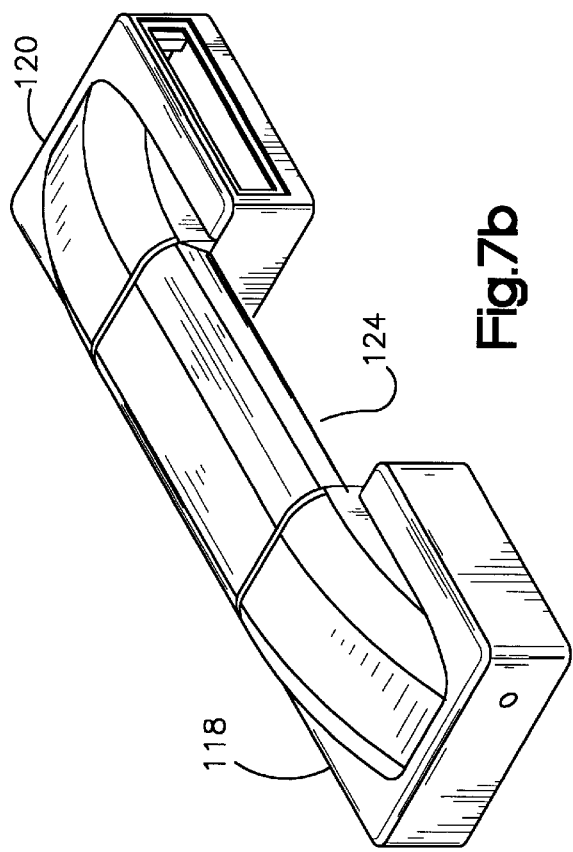
Figure 7A:
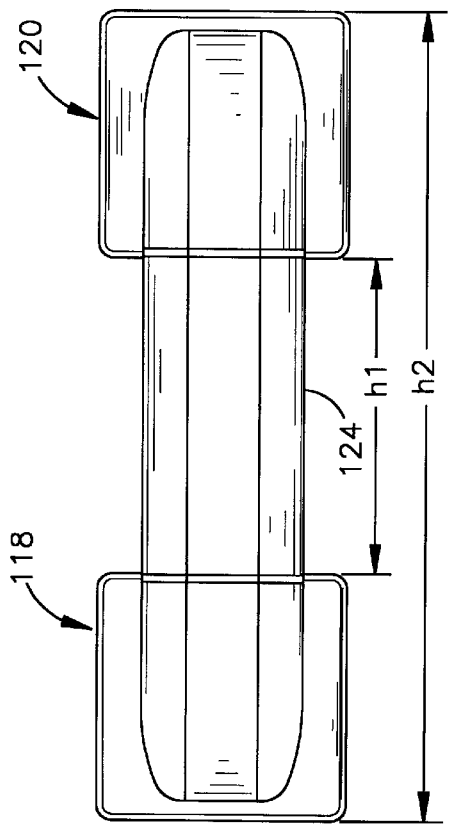
Figure 7C:
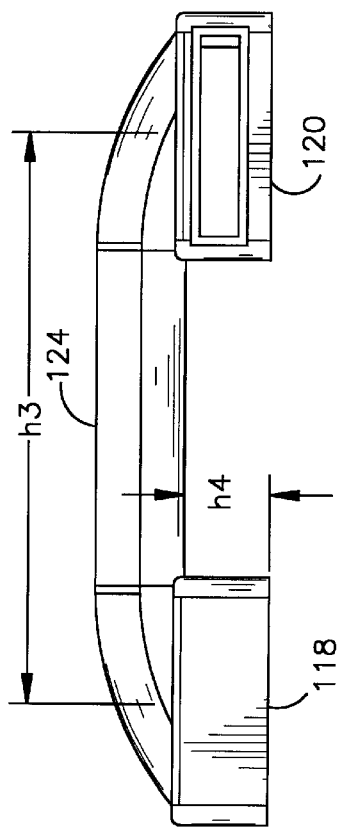

Turning now to FIG. 5, pictured is a rear view of the unit A, thereby exposing a multi-functional handle portion 110 attached thereto. The handle portion 110 is advantageously usable to minimize operator fatigue and also functions to hold various components or subassemblies necessary or desirable for a particular job application as will be described further below.

The handle 110 is advantageously selectably positionable or secured slidably to a base unit 70 via first and second mounting slots 112 and 114, respectively. Typically, an operator will use the apparatus by grasping it with one hand so as to render the display viewable, while leaving the other hand free for data entry. Such an orientation is comfortably provided for by provision of a grip portion 116 of the handle 110, around which an operator's fingers of the support arm are curled. The bottom or lower shell portion 70 is then resting on the operator's forearm. The moveable mounting allows for positioning the handle 110 relative to the base unit 72 to accommodate, equally comfortably, right or left handed users and may include intermediate handle positions. However, it will be appreciated that a default position is also suitably provided for both such users by permanently securing the handle 110 relative to the base unit 72. Such a permanent mounting facilitates acceptable ergonomics while lowering fabrication costs necessary to communicate data and power between the base unit 72 and the handle unit 110.

Next, the particular fabrication of the handle unit 110 will be described with added reference to FIG. 6. It will be seen from the illustration that, in addition to the grip 116, the handle 110 includes first or second distal portions 118 and 120, respectively. The grip 116 includes a removable door portion 122, the opening of which reveals a battery compartment 124 adapted to receive therein a battery 130. Presently, a significant portion of the weight associated with portable data processing devices is within the battery. Thus disposing the battery 130 within the grip 116 allows for placement thereon at that user's hand, thereby providing advantageous weight distribution and corresponding lessened operator fatigue and increased operator comfort. Further, the battery is readily accessible for replacement or charging.

The handle 110 also provides selective incorporation of a plurality of the peripheral units, such as those noted above. These are placed within one of the distal portions 118 or 120 which function as first and second compartment regions. Shown are several removable modules for illustrative purposes. The modules adapted for selective incorporation in this example, include a radio transceiver unit 134, wide area network ("WAN") module 136, and narrow band transceiver 138, and a satellite transceiver 140. In this fashion, the handle unit may be selectively placed with communication devices necessary for a particular task without undue costs, redundancy, or weight. Further, placement of the modules within the handle distributes the weight analogously to that noted in connection with the battery 130, thus increasing the ergonomics.

In the preferred embodiment, the unit A has a length L of approximately 11.25 inches, a width W of approximately 8.5 inches, and a thickness T of approximately 1.2 inches. The length and width thus approximate the size of a sheet of paper.

Also illustrated within FIG. 6 are several additional removable modules which may alternatively be used in connection therewith. Included are a charge coupled device ("CCD") unit 160 and a bar code scanner 162 such as a 2D or 1D scanner. Such modules may also include a CPU unit 142 advantageously used to provide independent intelligence or processor power. Also, additional memory may also be placed just within the handle as evidenced by a memory unit 144.

Also evidenced in FIG. 6 is an antenna portion 146 which is matingly receivable on distal portion 118, as illustrated. The antenna 146 provides for communication when radio transmission, such as that facilitated by radio transceiver 134, WAN transceiver 136, or narrow band transceiver 138 are utilized.

Turning to FIG. 7, the dimension of the handle 110 providing the ergonomically advantageous dimensions of the preferred embodiment will be described. Suitable dimensions are as follows:

h1=4.3"

h2=11.0"

h3=7.5"

h4=1.1"

h5=3.25"

h6=2.08"

h7=1.25"

h8=2.2"

The invention has been described with reference to the preferred embodiment. Obviously, modifications and alterations will occur to others upon the reading and understanding of this specification. It is intended that all such modifications and alterations be included insofar as they come within the scope of the appended claims or the equivalents thereof.

What is claimed is:

1. An electronic workslate unit comprising:
   a) a shell including a generally planar upper surface and a generally planar lower surface spaced apart from the upper surface defining an interior region, the shell further includes a handle extending from the lower surface, the handle includes a grip portion spaced from and disposed below a plane defined by the lower surface and configured to enable gripping and support of the workslate unit with one hand during use;
   b) electronic circuitry supported within the interior region, the electronic circuitry including a power supply component electrically coupled to a plurality of electronic modules and further wherein the handle defines an interior compartment adapted to interchangeably receive a selected one of an electronic module and the power supply component; and
   c) an interactive display screen supported by the shell, the screen forming a portion of the shell upper surface and electrically coupled to the electronic circuitry, at least a portion of the display screen being touch sensitive for data entry.

2. The electronic workslate unit of claim 1 wherein the grip portion defines an interior compartment adapted to interchangeably receive a selected one of an electronic module and the power supply component.

3. The electronic workslate unit of claim 1 wherein the handle includes a door selectively movable with respect to the handle for providing access to the handle interior compartment.

4. The electronic workslate unit of claim 3 wherein the handle door is selectively separable from and reattachable to the handle.

5. The electronic workslate unit of claim 1 wherein the handle includes first and second distal portions at opposite ends of the grip portion and wherein the first and second distal portions extend from the lower surface of the shell and the electronic circuitry includes a power supply component electrically coupled to a plurality of electronic modules and further wherein at least one of the first and second distal portions and the grip portion includes an interior compartment adapted to interchangeably receive a selected one of an electronic module and the power supply component.

6. The electronic workslate unit of claim 5 wherein at least one of the first and second distal portions includes an interior compartment adapted to interchangeably receive a selected one of an electronic module and the power supply component.

7. The electronic workslate unit of claim 5 wherein the handle includes a door selectively movable with respect to the handle for providing access to the interior compartment.

8. The electronic workslate unit of claim 7 wherein the handle door is selectively separable from and attachable to the handle.

9. An electronic workslate unit comprising:
   a) a shell having a generally planar front wall and a spaced apart generally planar back wall defining an interior region, the shell back wall including a handle extending from an outwardly facing surface of the back wall, the handle including a grip portion aligned with and spaced from the back wall outwardly facing surface and configured to enable gripping and support of the workslate unit with one hand during use;
   b) electronic circuitry supported within the shell interior region, the electronic circuit including a power supply component electrically coupled to a plurality of electronic modules and further wherein be handled defines an interior compartment adapted to interchangeably receive a selected one of the plurality of electronic modules; and
   c) a display screen connected to the shell and forming at least a portion of the shell front wall, the display screen being viewable from the shell front wall, the screen being electrically coupled to the electronic circuitry, at least a portion of the display screen being touch sensitive for data entry.

* * * * *